United States Patent [19]

Kabat et al.

[11] 4,210,823
[45] Jul. 1, 1980

[54] CONDITION CONTROL SYSTEM WITH SPECIAL SET POINT MEANS

[75] Inventors: John L. Kabat, Bloomington; Marvin D. Nelson, St. Louis Park, both of Minn.

[73] Assignee: Honeywell Inc., Minneapolis, Minn.

[21] Appl. No.: 905,704

[22] Filed: May 15, 1978

[51] Int. Cl.² .............................................. G05B 13/00
[52] U.S. Cl. .................................... 307/117; 219/492; 219/493; 219/499; 236/78 D; 307/134
[58] Field of Search ............ 307/117, 132 E, 132 BA, 307/98, 99, 134; 219/491, 492, 49 B, 499; 236/91 F, 78 D; 318/609, 632, 663

[56] References Cited
U.S. PATENT DOCUMENTS

| | | | |
|---|---|---|---|
| 2,761,052 | 8/1956 | Knudsen | 236/78 D |
| 3,514,628 | 5/1970 | Pinckaers | 307/117 |
| 3,629,607 | 12/1971 | Maddox | 307/117 |
| 3,649,877 | 3/1972 | Friedman | 307/99 |
| 3,767,936 | 10/1973 | Sweger | 307/117 |

Primary Examiner—L. T. Hix
Assistant Examiner—S. D. Schreyer
Attorney, Agent, or Firm—Alfred N. Feldman

[57] ABSTRACT

A time proportional control means, shown as a temperature control system, utilizes an expanded time constant arrangement with a unidirectional type of digital counter. The control system also utilizes a pulse generating means that is linked to the set point control for the system. Any substantial change of the set point causes the pulse generating means to generate pulses that are used by a pulse responsive circuit to insure that the counter for the system is adjusted to cause the output of the system to correspond with the new set point position.

10 Claims, 2 Drawing Figures

CONDITION CONTROL SYSTEM WITH SPECIAL SET POINT MEANS

CROSS-REFERENCE TO RELATED APPLICATION

The present application relates to concepts disclosed in an application filed on Jan. 27, 1978 having a Ser. No. 872,866 in the name of John L. Kabat, and an application filed on Jan. 27, 1978 having a Ser. No. 872,867 in the name of Arlon D. Kompelien with both of these applications assigned to the assignee of the present invention.

BACKGROUND OF THE INVENTION

Time proportional control systems that are condition responsive are known. One of the major applications of this type of condition responsive control system is in the control of heating and cooling equipment. The present invention is generally applicable to any type of condition control system that utilizes condition responsive time proportional control, but will generally be described in terms of a thermostatically controlled system or a thermostat.

A thermostat typically uses thermal anticipation to obtain a better system performance. This anticipation reduces the dependence on the ambient space temperature to activate the thermostat between its "on" and its "off" condition. Various means are used to obtain the anticipation heat, but all of these are thermal and are, therefore, subject to different air flows that exist in different installations. If the actual air flow over the thermostat in a particular application is greater or less than the air flow the thermostat was designed for, the actual temperature rise of the sensor due to the anticipator will be reduced or enhanced. This will result in less than optimum performance. A similar effect will occur if the air flow changes from time to time in a given installation. If the air flow is constant, the anticipator can be readjusted to bring back optimum performance, but in changing air flow conditions, no one setting will be optimum. It should be noted that in most thermostats, a change in the characteristics of the anticipator will also change the entire system droop.

In an electronic thermostat, anticipation can be achieved electronically. This has the advantage of not being affected by air flow and thus eliminates all of the problems associated with thermal anticipation as noted above. One method of obtaining this type of anticipation is the use of a resistor and a capacitor charge and discharge arrangement as part of the negative feedback in an electronic amplifier while using a fixed positive feedback. This type of electronic anticipation is injected as a negative feedback made with a single order time constant. For proper operation, this time constant may need to be in the order of sixteen minutes. To obtain this type of time constant with a single resistor-capacitor arrangement requires high resistances and a very low leakage, large capacitor. This arrangement makes obtaining this type of electronic anticipation impractical. The size of the resistor and capacitor would place a burden on the cost of the device, and on the physical size of the thermostat itself.

To obtain the desired time constant of approximately sixteen minutes, a relatively small capacitor and reasonably sized resistors can be used thereby obtaining the relatively fast cycling rate in the time proportional control circuit. This relatively fast cycling rate can then be directly counted. If a counter is allowed to count up at a given rate during the "on" time of the anticipation, and another counter is allowed to count up at the same rate during the "off" time, we would have a digital representation of the "on" and the "off" time periods for the desired operating condition (this is the actual deviation from the set point of the room temperature). The sum of these two counters is the cycling period. this type of information gives a complete description of the cycling pattern of the system for a constant input of a given magnitude. If the average room temperature and the set point remain constant, we would then let the cycling pattern continue, but no longer allow the counters to count up. Each time the "on-off" action of the comparator or electronics occurs, the time counter would be reduced by one count. When the counter reaches zero counts, the system would turn "off". The "off-on" action of the comparator or electronic amplifier would then start to count down the "off" time counter. When the "off" time counter reaches zero, this system would then turn "on" and the counter would be allowed to count up at the given rate. This multiplies the "on" and "off" period of the number of counts stored in the counter. Since the basic "on" and "off" periods are determined by a constant, the constant also effectively, multiplies by the same constant. To keep the system closer to the actual operating conditions, the "off" period counter can be updated each time the "on" period counter is counted down. Similarly, the "on" period counter can be updated each time the "off" period counter is counted down. As thus described, the system would work well as long as the comparator is cycling. However, if a set point change is made, or the deviation from the set point is such that the cycling stops, there is a possibility that the control can go out of "phase". That is, that furnace can be "on" when it should be "off", or the opposite can occur. Therefore, some means must be provided that will sense when these conditions occur and force the output into the proper state. One way would be to use two level detectors which would force the output into the proper state when the deviation from the set point is greater than the maximum anticipation signal or when the deviation is effectively negative. This method would involve a very critical calibration. An expanded time constant control system utilizing the up-down counters has been previously disclosed. That system utilizes a time proportional control system coupled with an up-down counter and a pulse generating means that had a signal combined in the counter to expand the time constant. The use of an up-down counter entailed certain complexities that may be avoided or simplified.

One simplification is in the use of a time proportional circuit utilizing a relatively small capacitor and resistors, and a rapid cycling rate. The rapid cycling rate is then sensed by a unidirectional counter that forms part of the counting means. The unidirectional counter in one simple form, is a ripple counter. The cycling rate of the time proportional control is combined with the pulse rate of a pulse generating means. This arrangement utilized a readily available type of digital counter. It further had the advantage that the system could never go out of synchronization with the state of the condition being responded to even if there was a sudden change in the condition or a sudden change in the set point of the condition responsive system. That type of system, however, could have an undesirable delay that occurs when the set point is suddenly changed to a value which would be outside of the proportional band of the system. The system would than have to wait out a rather long period of time until the inputs and the outputs of the control system are brought into proper correspondence with one another.

SUMMARY OF THE INVENTION

The present invention involves a condition responsive time proportional control that has been specifically disclosed as a temperature responsive control means or a thermostat. The time proportional control circuit utilizes a relatively small capacitor and resistors, and a relatively rapid cycling rate. This cycling rate is sensed by a unidirectional counter that forms part of the counting means. The undirectional counter, in one simple form, includes a simple ripple counter. The cycling rate of the time proportional control means is fed directly to the counting means.

In the present invention a sudden change in the set point of the system is immediately sensed and the condition control system means is adjusted by providing a pulse generating means that is part of the condition control set point means. The pulse generating means generates a pulse whenever the condition control set point means is moved a sufficient amount to cause the system to be out of the proportional band. The pulses generated by the pulse generating means are fed into a pulse responsive circuit means. This portion of the system is connected to an intermediate portion of the condition control means to reset the condition control system means so that the switched output of the system is brought into correspondence with the newly set position of the condition control set point means. In its very simplest form, the pulse generating means is an electrical grid which is swept by a grid wiper with the grid wiper being moved in unison with the set point potentiometer for the system.

DESCRIPTION OF THE PREFERRED EMBODIMENT

Figure 1:
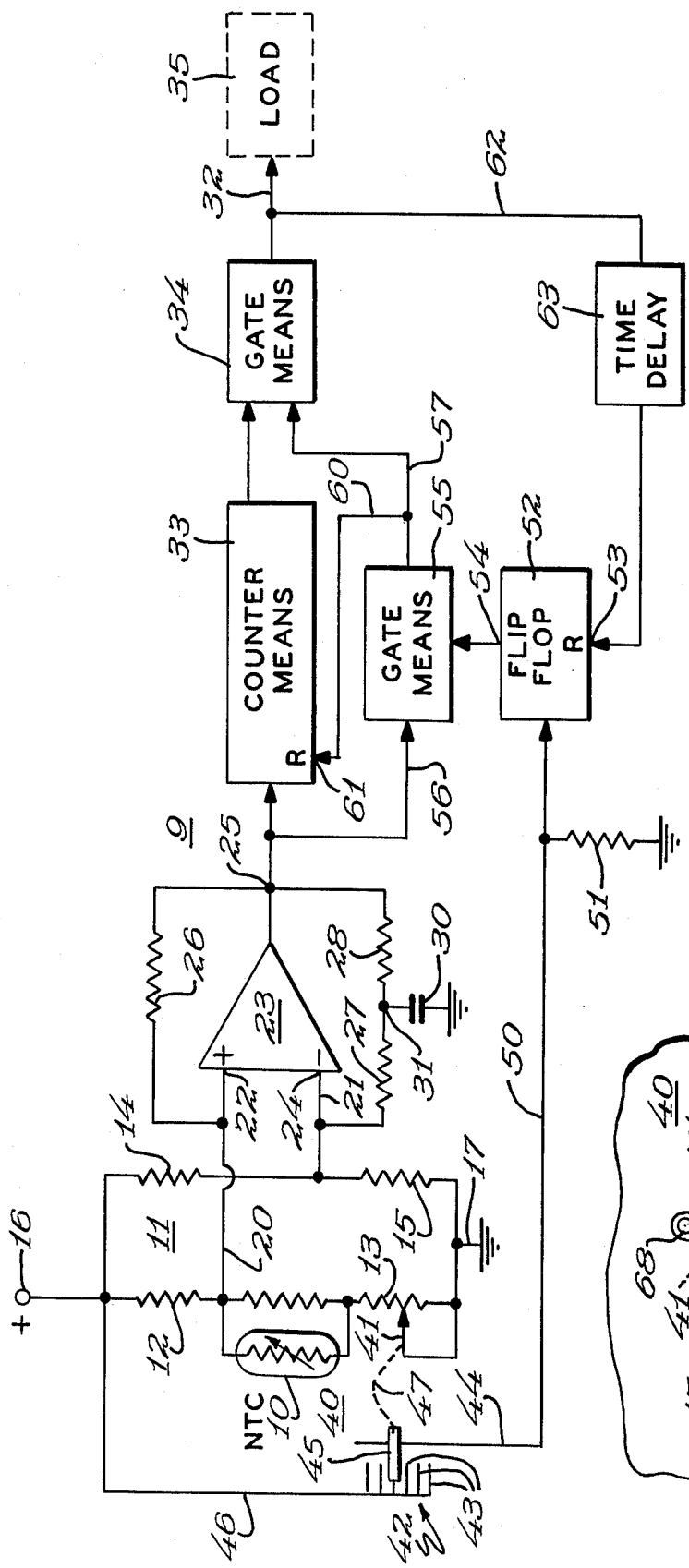
FIG. 1 is a schematic representation of an entire condition control device.

A complete condition control system is disclosed in FIG. 1. While the present condition control system can respond to any type of condition responsive means, the description will be generally directed to a thermostat or temperature responsive type of condition control system. A condition responsive time proportional control means is generally disclosed at 9. A condition responsive element 10, disclosed as a temperature responsive resistor, is provided in a bridge circuit 11 that includes a further resistor 12 and a set point potentiometer 13 as one leg of the bridge. The second leg of the bridge includes a voltage divider made up of the resistors 14 and 15. The bridge means 11 is energized from a potential generally connected at a terminal 16 with a common or ground 17. If the presently disclosed device were a thermostat and a temperature responsive resistor 10 was used, it would normally be a negative temperature coefficient resistor for sensing and controlling the ambient temperature while the set point potentiometer 13 would establish the point of control for the system.

The output of the bridge means 11 is on a pair of conductors 20 and 21 with the conductor 20 connected to the non-inverting terminal 22 of an operational amplifier 23, while the inverting terminal 24 is connected to the conductor 21. The operational amplifier 23 has an output at junction 25. Between the junction 25 and the conductor 20, a positive feedback resistor 26 is provided to create a positive differential for the system. Between the junction 25 and the conductor 21, a further pair of resistors 27 and 28 are provided along with a capacitor 30 that is connected at a common point 31 between the resistors 27 and 28. The network of resistors and capacitor between the junction 25 and the inverting terminal 24 of the operational amplifier 23 provides a time proportional negative feedback which is responsible, along with the resistors 14 and 15 for a time constant in the control systems operation. In the present disclosure, the time constant created by the resistors 14, 15, 27 and 28, and the capacitor 30 is a relatively short time constant and is the time constant which is altered for the control of the balance of the system. The charge and the discharge of capacitor 30 is regulated by the associated resistors, and of the circuitry described to this point forms most of the input circuitry for the condition control system 9. The condition control system 9 ultimately has a switched output at 32 after the signal at junction 25 has been processed by counting means 33 and gate means 34. The switched output 32 is fed to a load 35, which in the case of a heating system could be a conventional furnace.

To this point, the system disclosed would operate much as the system noted in the cross-referenced, related applications. The system to this point has the undesirable characteristic of possibly having the counting means 33 and gate means 34 in a partial count mode of operation when the set point potentiometer 13 is suddenly changed to a value outside of the proportional band of the control system. If this were the case, the cycling at the junction 25 would cease and the counting means 33 might contain a partial count. Also, the change in the set point 13 could be in a direction opposite to the state at which the switched output 32 than stood. This could provide for an undesirable mode of operation of the system.

In order to avoid the problems mentioned, the present set point potentiometer 13 is provided with the following further structure. A pulse generating means generally disclosed at 40 (which includes the potentiometer 13), a potentiometer wiper 41, and a pulse generating device 42. The pulse generating device 42 is made up of a grid of conductors 43, a common conductor 44, and a sliding wiper 45. The grid 43 is connected by a conductor 46 to the potential terminal 16 thereby providing a constant source of potential on the grid element 43. The wiper 45 is mechanically linked at 47 to the wiper 41 so that any time the potentiometer wiper 41 is moved the grid wiper 45 is also moved. The grids spacing is such that the grid wiper touches only one grid element at a time. The grid spacing is further designed so that a movement of the wiper 45 from one grid element 43 to another occurs only when the movement of the potentiometer wiper 41 is such as to move a sufficient amount to cause a set point change sufficient to move the system out of its proportional band of operation.

It will be noted that each time the grid wiper 45 moves to a new element 43 of the grid or pulse generating means 42, that a direct current pulse is generated on the conductor 50 to a circuit completed through a resistor 51 to ground. The conductor 50 will have pulses on it anytime the movement of the set point means is adequate to cause the system to go outside of the proportional band. The pulses on conductor 50 are fed to a flip flop 52. The flip flop 52 is provided with a reset 53 and an output 54. Each time the flip flop operates, the output at 54 is fed to digital gate means 55 that has a further input conductor 56 that is connected back to the junction 25 to sense the then existing state of the output of the cyclic portion of the condition control system. The application of a signal from the output 54 of the flip flop 52 to the gate means 55 allows the signal on conductor 56 to be gated to conductor 57 where it is fed to the gate means 34. The gate means 34 allows the signal on conductor 57 to be applied to the switched output means 32 thereby setting the load 35 to correspond with the then existing condition at the junction 25. It is thus apparent that if a sudden set point is made at the set point means 40, that the pulse generating means 42 activates an immediate response to the new condition at the junction 25 through the gate means 55 to the gate means 34 where it is applied via the switched output means 32 to the load 35. This allows the load 35 to be brought into correspondence with the desired new set point means 40 setting immediately.

The gate means 55 has a further output conductor 60 that is connected to a reset terminal 61 of the counter means 33. This allows for immediate resetting of the counter means 33 under the changed set point means condition. The gate means 55 always has an output 1 when a change of state is required from the input of the counter means 33 to the load 35. The reason for the reset is to allow the system to begin functioning immediately upon the system coming back within the proportional band where the cyclic output of 25 again exists. The basic system is completed by the addition of a conductor 62 from the switched output means 32 through a time delay device 63 to the reset 53 of the flip flop 52. The time delay device allows the system to reset so that the pulse generating means 42 can bring the system output at the load 35 into correspondence with the switched output at junction 25, and then have the flip flop 52 reset awaiting the entry of any further change in the set point means.

With the arrangement disclosed, a movement of the wipers 41 and 45 sufficient to generate a pulse on conductor 50 immediately resets the load 35 to correspond with whatever value of control is indicated by the output at the junction 25. This eliminates long delays that can be encountered by the counting means 33 having to count up the sufficient number of counts to change the output, as would be the case otherwise.

Figure 2:
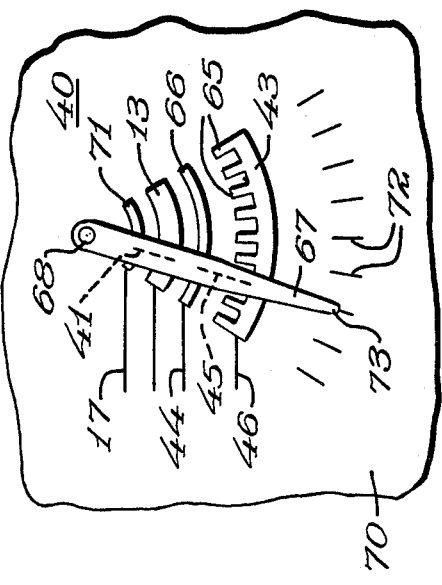
FIG. 2 is a drawing of a portion of a simple condition control set point means.

In FIG. 2 a fragment of the condition control set point means 40 is disclosed. Similar numbers to FIG. 1 will be used in FIG. 2 where the items are the same. An electrically conductive grid 43 is disclosed in an arced configuration having a series of projections 65 that are electrically connected to a conductor 46. The wiper 45 is again disclosed as bridging between the grid 43 and a slide 66 which is connected to the conductor 44. The wiper 45 is part of an insulating lever means 67 which is pivoted at 68 and has an arc which agrees with the curvature of the conductive grid 43. It is thus apparent that any movement of the lever means 67 moves the wiper 45 across the teeth 65 of the grid 43 thereby intermittently opening and closing an electrical circuit between the conductors 44 and 46.

At the same time the lever means 67 is moved, it provides a movement of the wiper 41 of the potentiometer resistor 13 which has been disclosed as a flat resistive element disposed on a nonconductive substrate 70. The substrate 70 can be a conventional type of insulating board with the potentiometer resistor 13 deposited or attached thereto, or could be a ceramic substrate using hybrid technology with a deposited resistor 13 along with deposited conductor 66 and a deposited grid 43. If this were the case, a further deposited conductive element 71 would be provided that is connected to ground 17 as part of the potentiometer arrangement. The pivoted movement of the lever means 67 causes the wiper 41 and the grid wiper 45 to move concurrently or in unison across the varying resistance element 13 and the grid element 43 to simultaneously provide for the set point means change in the bridge 11 and also generate the necessary pulses on conductor 44 for the operation of the reset of the system. A scale 72 is disclosed opposite an end 73 of the lever means 67 so that the lever means 67 can also be used as an indicator, such as a temperature indicator, on the set point means. With the arrangement just disclosed a very simple, inexpensive pulse generating means which incorporates the necessary potentiometer and a set point arrangement for a thermostat has been disclosed.

It is obvious that any number of types of physical structures could be used to generate pulses when the set point means of the condition control system is changed could be provided. Also various types of condition control systems that utilize the cyclic arrangement could be provided. The types of gate means, flip flops, and counting means can all be varied extensively within the obvious skill of anyone working in the digital art. For these reasons, the applicants wish to be limited in the scope of their invention solely by the appended claims.

The embodiments of the invention in which an exclusive property or right is claimed are defined as follows:

1. Means for sensing a change in a set point of a condition control system, including: condition control system means responsive to a sensed condition and including condition control set point means; said condition control system means having a switched output upon said system means sensing a condition within a proportional band of said system; said condition control system means having a constant output upon said system means sensing a condition outside of said proportional band; said set point means including pulse generating means activated by movement of said set point means; and pulse responsive circuit means responsive to said pulse generating means and connected to an intermediate portion of said condition control system means; said pulse generating means activating said intermediate portion of said condition control system whenever said set point means is moved to cause the set point of said system means to have a value outside of said proportional band of said system; said pulse responsive circuit means responding to the change of said set point means to cause said intermediate portion of said condition control system means to adjust said switched output to correspond with said set point means.

2. Means for sensing a change in a set point as described in claim 1 wherein said condition control set point means includes a potentiometer having a wiper; and said pulse generating means includes an electrically conductive grid having a wiper with said grid wiper being constructed to alternately electrically connect and disconnect a circuit to said grid; said two wipers being operated in unison.

3. Means for sensing a change in a set point as described in claim 1 wherein said condition control system means is a temperature control system.

4. Means for sensing a change in a set point as described in claim 3 wherein said temperature control set point means includes a potentiometer having a wiper; and said pulse generating means includes an electrically conductive grid having a wiper with said grid wiper being constructed to alternately electrically connect and disconnect a circuit to said grid; said two wipers being operated in unison.

5. Means for sensing a change in a set point as described in claim 4 wherein said temperature control system includes bridge circuit means having a temperature responsive resistance to sense a temperature to which said control system responds; and said bridge circuit means further includes said potentiometer.

6. Means for sensing a change in a set point as described in claim 5 wherein pulse responsive circuit means includes digital gate means which responds to said pulse generating means when said grid wiper is operated to alternately connect and disconnect said circuit to said grid.

7. Means for sensing a change in a set point as described in claim 6 wherein said digital gate means includes a flip flop.

8. Means for sensing a change in a set point as described in claim 7 wherein said digital gate means further includes time delay circuit means from said control systems means switched output to reset said digital gate means after said control system means responds to a change in said set point.

9. Means for sensing a change in a set point as described in claim 5 wherein a portion of said potentiometer and said grid are disposed upon a flat, nonconductive surface.

10. Means for sensing a change in a set point as described in claim 9 wherein said potentiometer wiper and said grid wiper are separate conductive portions of lever means that also acts as an indicator for said set point means.

* * * * *